United States Patent [19]
Labalme

[11] 3,887,902
[45] June 3, 1975

[54] METHOD AND APPARATUS FOR PROCESSING CALLS DISTRIBUTED RANDOMLY IN TIME AND REQUIRING RESPONSE DELAYS OF ANY DURATION, BUT SPECIFIED FOR EACH CALL

[75] Inventor: Pierre Labalme, Paris, France

[73] Assignee: Compagnie Honeywell Bull (Societe Anonyme), Paris, France

[22] Filed: Sept. 25, 1973

[21] Appl. No.: 400,578

[30] Foreign Application Priority Data

Sept. 29, 1972 France ............................ 72.34508

[52] U.S. Cl. ..... 340/172.5; 179/18 BG; 179/18 ES; 444/1

[51] Int. Cl. ...... G06f 9/16; G06f 9/19; G04c 23/38

[58] Field of Search ..................... 444/1; 340/172.5; 179/18 BG, 18 ES

[56] References Cited

UNITED STATES PATENTS

| | | | |
|---|---|---|---|
| 3,553,385 | 1/1971 | Morgan et al. | 179/18 BG |
| 3,582,896 | 6/1971 | Silber | 179/18 ES X |
| 3,623,001 | 11/1971 | Kleist et al. | 340/172.5 |
| 3,623,007 | 11/1971 | Echart et al. | 340/172.5 |
| 3,633,181 | 1/1972 | Sikorsky | 340/172.5 |
| 3,647,979 | 3/1972 | Rubin | 179/18 ES |
| 3,676,860 | 7/1972 | Collier et al. | 340/172.5 |
| 3,686,641 | 8/1972 | Logan et al. | 340/172.5 |
| 3,701,973 | 10/1972 | Von Der Pfordten | 340/172.5 |

*Primary Examiner*—Raulfe B. Zache
*Assistant Examiner*—Jan E. Rhoads

[57] ABSTRACT

The method, and apparatus therefor, for processing calls transmitted at random from calling devices, each call specifying a response delay before such call should be processed, wherein the calls are chained into a waiting queue as they are detected, and wherein the calls in the queue are processed according to their specified response delays.

15 Claims, 14 Drawing Figures

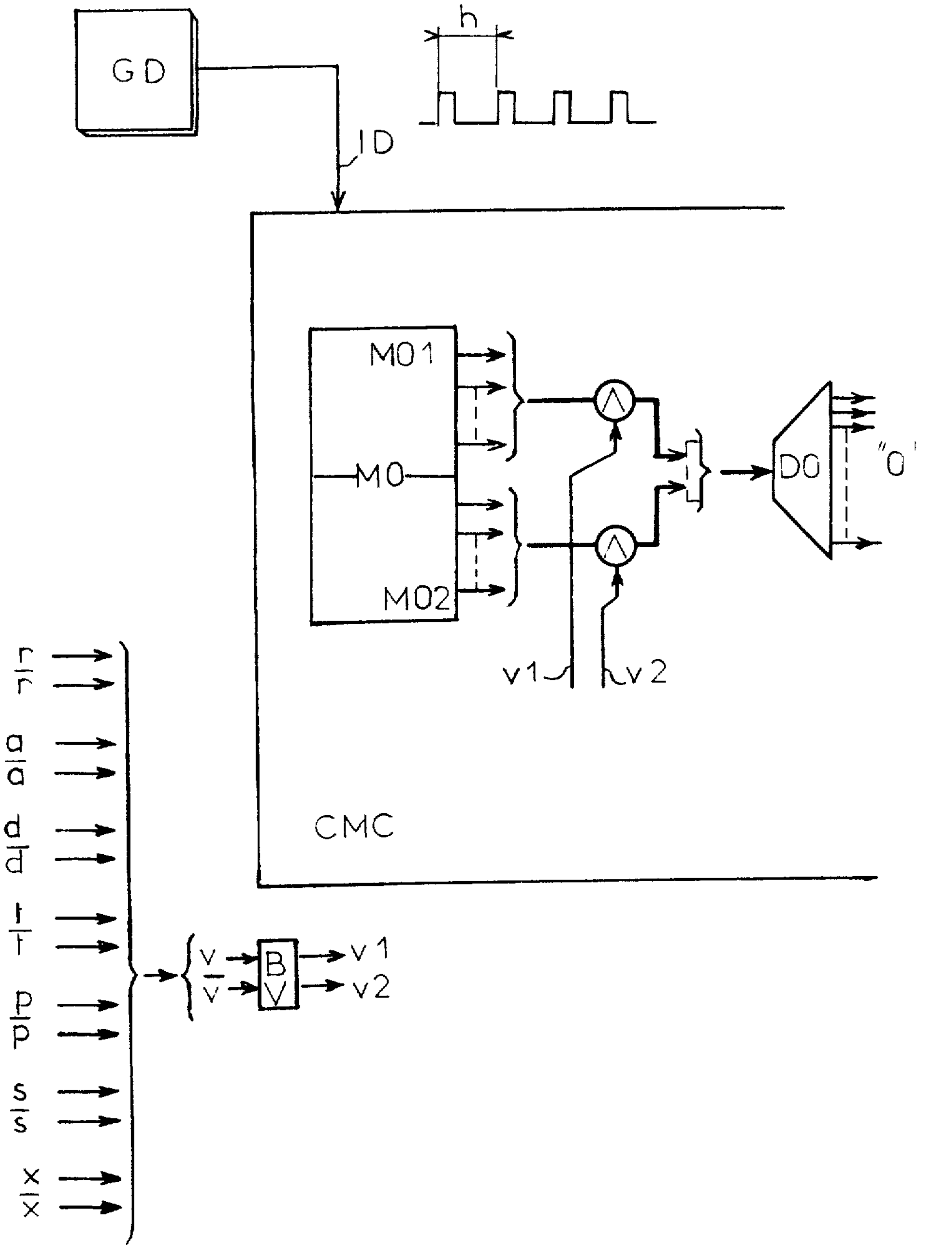
FIG-2 UCS

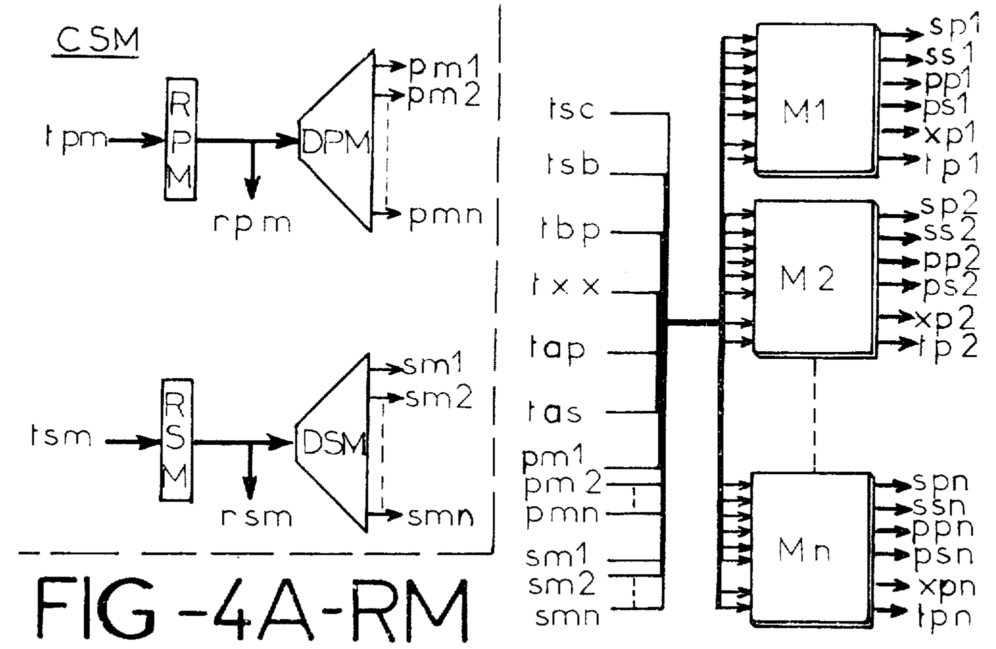
FIG-4A-RM
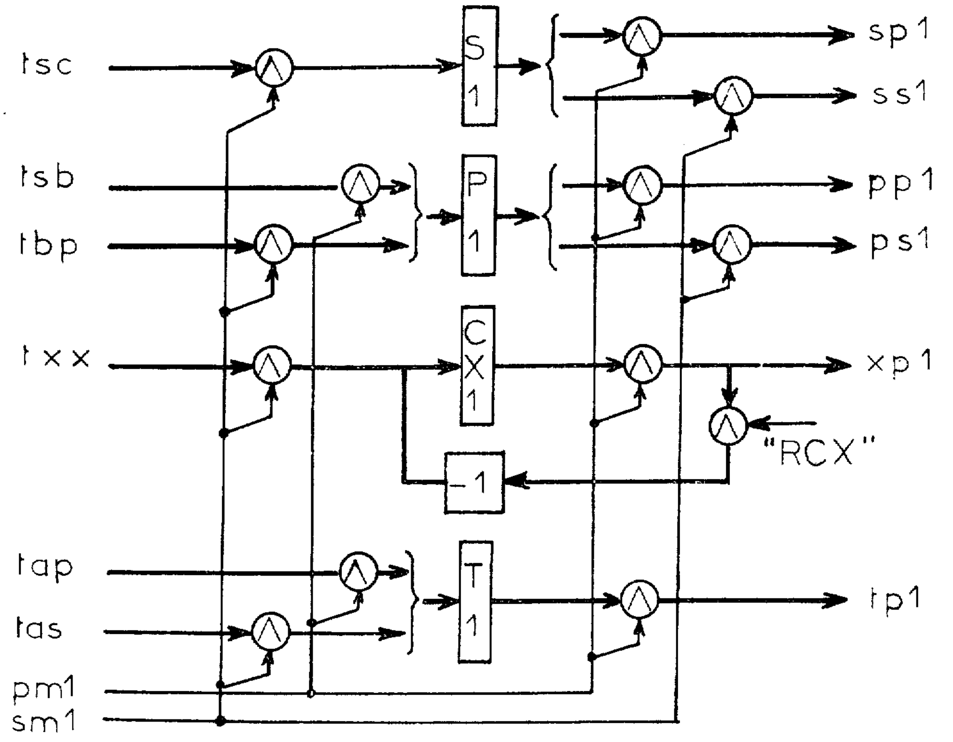
FIG-4B-M1

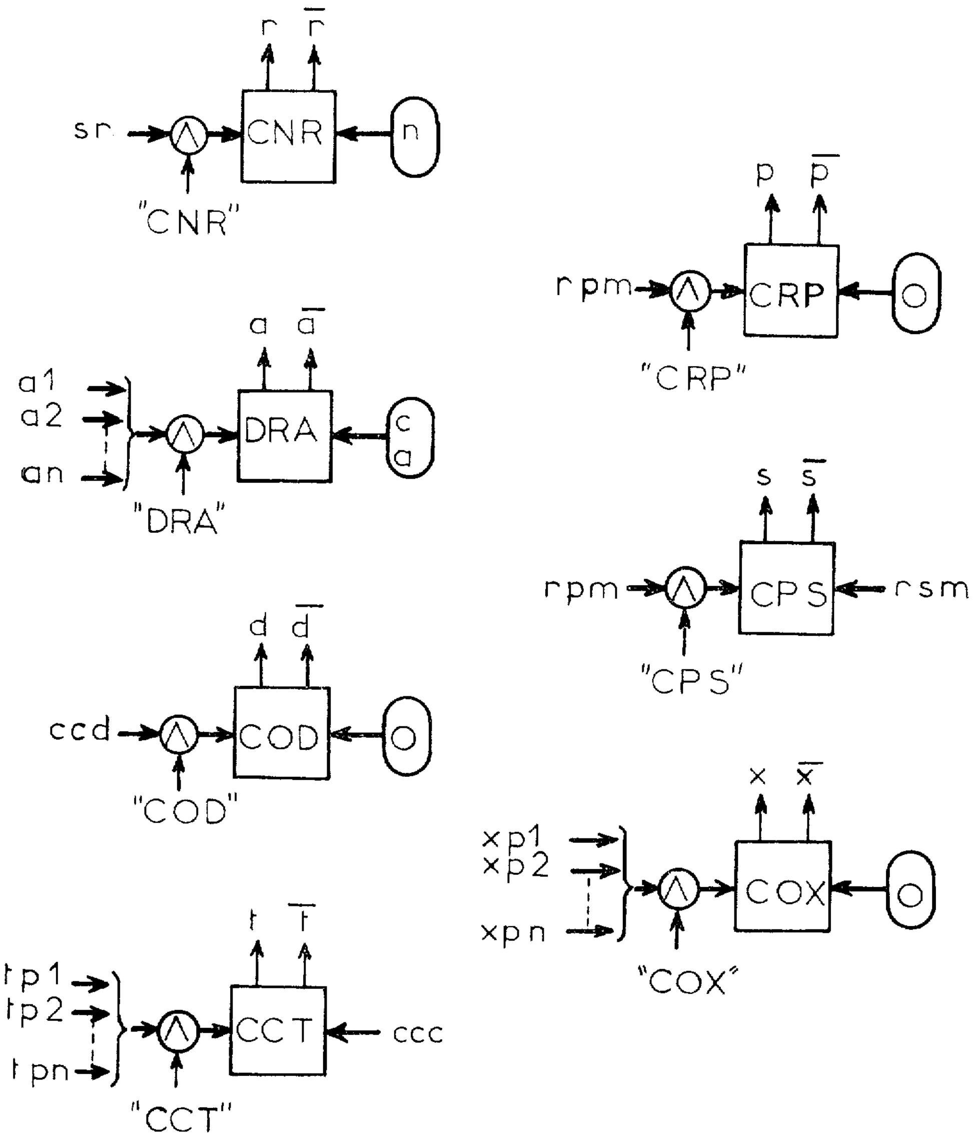
FIG-6A.RCP

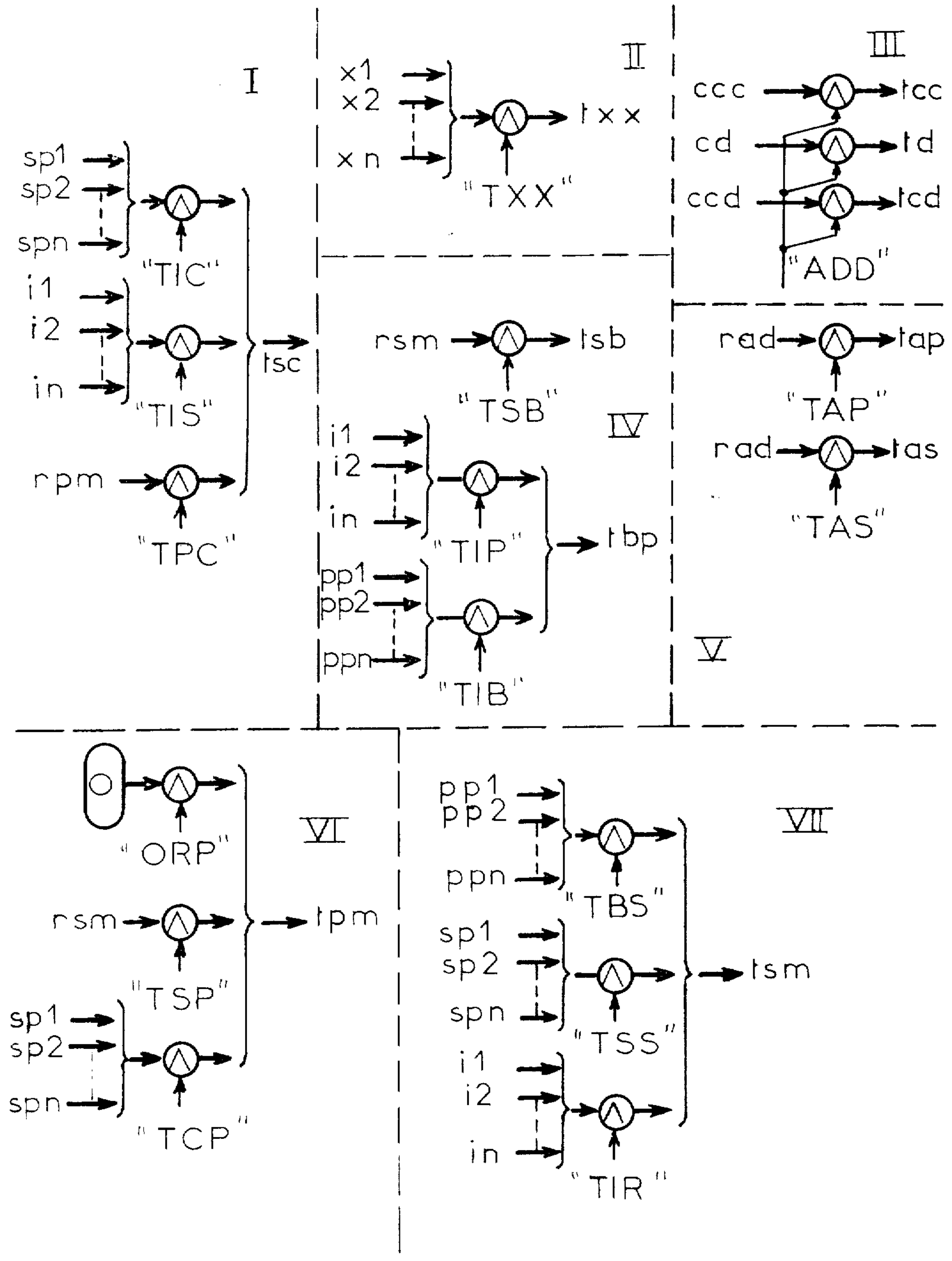
FIG-6B-RT

METHOD AND APPARATUS FOR PROCESSING CALLS DISTRIBUTED RANDOMLY IN TIME AND REQUIRING RESPONSE DELAYS OF ANY DURATION, BUT SPECIFIED FOR EACH CALL

BACKGROUND OF THE INVENTION

This invention relates to a method, and to circuits implementing the method, for processing calls distributed randomly in time and requiring response delays of any duration, but wherein the response delay is specified for each call.

The solution offered to the problem thus formulated can be advantageously applied to data processing systems for responding, with care to performance, to the multiple needs arising from the ever-increasing strict control required to be exercised over the operation of the various units entering into such systems.

In general, the method of the invention may be applied in any field wherein there is posed the necessity of satisfying request which can be generated at any moment by different sources, each of these requests being characterized by the formulation of a delay at the end of which the request must be processed.

The circuits of the invention will be particularly best employed in a data processing system by selecting elements utilized for applying the claimed method.

The formulation of the method of the invention must take into account a certain number of parameters, particularly the minimum delay before a request can be processed, this minimum delay being fixed by the characteristics of the system formed by the request-generating sources and the processor with which they are associated. Thus, the required delay can be expressed as a function of this minimum delay.

SUMMARY OF THE INVENTION

The method of the invention for the processing of calls distributed randomly in time and generated by $n$ devices, each call being accompanied by a data item $x$ specifying the response delay required by the calling device by expressing the coefficient to be assigned to a minimum time interval $d$ fixed by the configuration of the system formed of the $n$ devices and there processor, is principally characterized:

- in that it consists of defining successive identical control cycles with a time interval $h$ equal to a submultiple of the minimum interval $d$;
- in that each cycle comprises two phases:
  - a phase of detecting calls and of chaining the detected calls into a circular waiting queue, during which phase the position in such waiting queue of a chained call is defined by assigning to said call a test time $t$ which is calculated by adding to the execution time H of the cycle, the minimum time interval $d$ and a delay $a$, possibly equal to 0, wherein delay $a$ is determined in such a manner that the test times $t$ of successively chained calls are separated by an interval equal at the minimum to the time interval $h$ that separates two successive control cycles;
  - a phase of testing the waiting call whose test time $t$ is closest to the execution time H of the cycle, during which phase the coefficient $x$ is reduced by 1 if time $t$ is equal to time H, and the call is unchained from the waiting queue if coefficient $x$ has become equal to 0.

The circuits of the invention for implementing the method defined above are principally characterized by comprising:

- a sequential control unit consisting basically of a control memory circuit and a pulse generator for triggering control cycles in connection with the memory circuit;
- a network of $n$ identifiable call receivers, each assigned to a device and associated with a common sequential selection circuit;
- a network of $n$ alterable memories, each assigned to a device and associated with common circuits for selection by transfer of identity, each of said memories comprising means for chaining said memory into a circular waiting queue formed of memories assigned to the devices that have generated a call in the course of processing;
- a calculating network consisting basically of an adder whose inputs are coupled to a register of fixed contents $d$, to a cycle counter clock-register and to an incrementer-decrementer register which is coupled to the sequential control unit in order that its contents $a$ evolve as a function of the number of cycles counted and as a function of the number of memories chained into the circuit waiting queue; and
- a transfer network under control of the control memory circuit for sequentially coupling the network of receivers, the network of memories, and the calculating network, said transfer network comprising a comparator network whose outputs are coupled to the sequential control unit.

BRIEF DESCRIPTION OF THE DRAWING

The invention will be described with reference to the accompanying drawing, wherein:

FIGS. 2, 3A, 3B, 4A, 4B, 5, 6A and 6B are schematic diagrams of the circuits shown as blocks 2, 3, 4, 5 and 6 in FIG. 1;

DESCRIPTION OF THE PREFERRED EMBODIMENT

Figure 1:
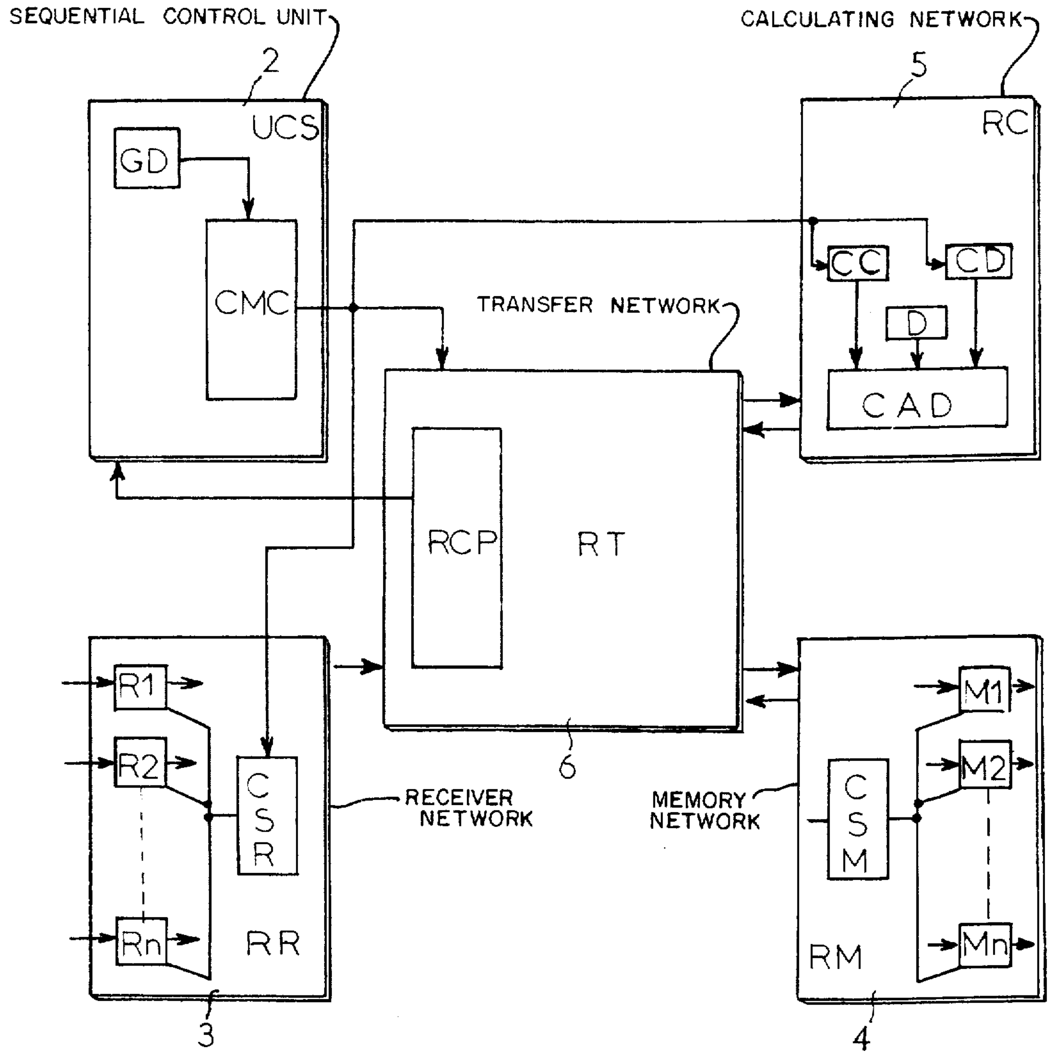
FIG. 1 is a block diagram of circuits implementing the method in accordance with the invention.

As shown in FIG. 1, the circuits implementing the method according to the invention comprise: a sequential control unit 2, a receiver network 3, a memory network 4, a calculating network 5, and a ttransfer network 6. transfer Sequential control unit 2, also designated by the reference symbol UCS, comprises a control memory circuit CMC and a trigger generator GD which furnishes pulses to control memory circuit CMC. As is known, each pulse supplied by generator GD triggers a cycle of the sequential control cycles, which results in a series of orders (comparison, transfer, etc.) being transmitted to transfer network 6.

Transfer network 6, also designated by the reference symbol RT, comprises an arrangement of AND-gates, enabled consecutively during a control cycle, and a comparator network RCP, whose output leads are connected to sequential control unit UCS for selectively modifying the sequence of orders as a function of the results of the comparisons, as is known in the art.

Receiver network 3, also designated by the reference symbol RR, comprises n identifiable call receivers R1...Rn and a sequential selection circuit CSR common to the *n* receivers. Each receiver R1–R*n* is assoicated with a device (not shown) that is adapted to generate a call along with a data item expressing the delay at the end of which the call must be processed. Each receiver assures the storing of the identity of the device to which it is assigned, of the call and of the delay data item. Sequential selection circuit CSR is coupled to control memory circuit CMC in a manner to cause, during a control cycle, the sequential selection of the *n* call receivers and to take into account the information which they store.

Memory network 4, also designated by the reference symbol RM, comprises n alterable memories M1 . . . M*n* and circuits CSM for selection by transfer of identities. Each of memories M1–M*n* is assigned to a device and, therefore, to a respective one of call receivers R1-R*n*. Each of memories M1–M*n* comprises means enabling the chaining of such memory into a circular waiting queue. Memory network RM can be coupled, through the intermediary of transfer network RT, to receiver network RR and to calculating network 5.

Calculating network 5, also designated by the reference symbol RC, comprises an addition circuit CAD whose input leads can be coupled to a register D, whose contents represent the fixed time d (the minimum time interval fixed by the configuration of the system), to a register CC, whose contents represent the execution time H of the cycle under consideration, and to a register CD, whose contents a evolve as a function of the number of cycles counted and the number of chainings effected.

The method of the invention which employs the capabilities of the arrangement that has been described above is defined by the following operations:

When operating, trigger generator GD furnishes pulses to control memory circuit CMC, such pulses being spaced apart separated by the time interval *h*. These pulses are counted in register CC. Each pulse also triggers the operation of a control cycle whose successive orders are expressed by combinations of signals appearing in sequence on the output leads of circuit CMC. Certain of these orders are comparison orders and, as is known, the comparisons effected selectively modify, according to the results of the comparisons, the execution of the control cycle. The results of the comparisons are delivered by network RCP.

The control cycle comprises the following two phases:

1. A phase of detecting calls and of chaining the detected calls into a circular waiting queue. The orders generated by sequential control unit UCS cause the sequential selection of call receivers R1–R*n* by means of sequential selection circuit CSR. As each call is detected the delay data item *x* which accompanied such call is transferred into the particular memory of the network of memories M1–M*n* that corresponds to the one of receivers R1–R*n* then selected. Also transferred into such correponding memory is a data item *t*, furnished by calculating network RC. Data item t is obtained by adding to the number of cycles counted by register CC (representing the execution time H of the cycle), the contents of register D (evaluated in terms of time interval *h*) and the contents of register CD. The contents of register CD evolve according to the course of this phase (the value which such contents represent being equal to 0 at the start of the operation), being increased by the value *h* each time that a call is detected and chained. Thus, if several calls are detected and successively chained during this phase of a single data cycle, the dataa item t stored in the successively selected memories will be separated by the time interval *h*. The data item *t* stored in a memory determines the time at which such memory must be tested. It is to be noted that the process is directed toward providing the first test on the first memory chained.

2. A phase of testing the waiting call whose test time t is the closest to the execution time H of the cycle. During this phase, if execution time H has reached the tested value of *t*, the coefficient represented by the corresponding delay date item *x* (expressed in terms of time *d*, the predominant value in the determination of the test time) is decremented by 1. Moreover, if during this phase, coefficient *x* becomes equal to 0, the corresponding memory is unchained and the call stored therein is processsed. However, if after decrementing, such coefficient *x* remains greater than 0, a new test time *t'* is calculated and stored in such corresponding memory, and the contents of register CD are increased by the value *h*. The waiting call to be tested in the next control cycle becomes that whose parameters were stored in the memory next chained in the waiting queue after the memory last tested.

Finally, during each control cycle, the contents of register CD are reduced by the value *h*. This arrangement maintains an interval of time h between the test time t of various memories chained by avoiding increasing indiscriminately the contents of register CD, thereby reducing as much as possible its influence on the evaluation of the test times.

FIGS. 2–6 represent in detail the circuits shown as blocks in FIG. 1. Their description enables a clearer understanding of the operation of the circuits of the invention which carry out the claimed process.

FIG. 2 illustrates details of sequential control unit UCS. Sequential control unit USC comprises a trigger generator GD, which furnishes pulses, designated by the reference numeral ID, separated by time interval *h*, and a control memory circuit CMC, only partially represented. Memory circuit CMC comprises a fixed memory MD of known type, associated with selection registers and transfer registers (not shown), which furnishes at the output leads thereof a succession of signal combinations. The signal combinations delivered by fixed memory MO are decoded in a decoder DO, whose decoded results represent a succession of orders O. As is known, each selection in fixed memory MO gives rise to the occurrence of two signal combinations, from which the choice of one combination, and therefore of a single order 0, is made by means of a flip-flop BV. The output signals *v*1 and *v*2 of flip-flop BV enable one or the other of two AND-gates, through which the chosen signal combinations are transferred to decoder DO.

The complementary signals for controlling flip-flop BV, signal *v* and signal *v*, represent, at a given instant, the complementary signals *r* and *r*, *a* and *a*, . . . , or *x* and *x*, all of these latter complementary signals issuing from comparator network RCP, FIG. 6A. A more detailed description of such a circuit is found in the French patent application No. 7,213,525, assigned to the assignees of the instant invention, and filed Apr. 18, 1972, for "Improvement of Information-Processing System in Particular of Control Units for Peripheral Units, Utilized in Such Systems," and in the corresponding United States patent application Ser. No. 350,553, filed Apr. 12, 1973, in the same of G. G. R. Sauger.

Figure 3A:
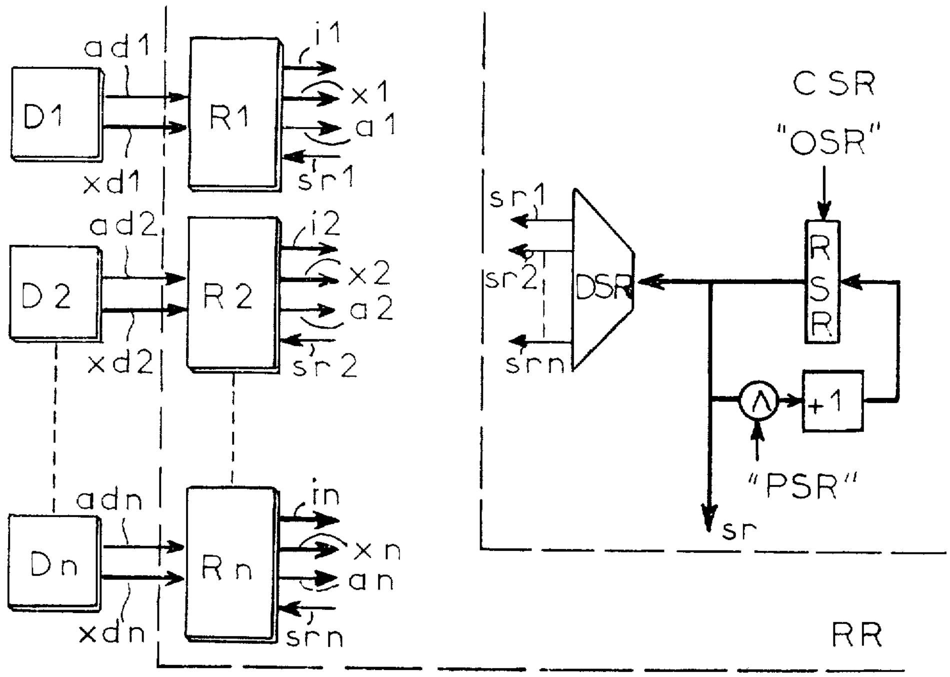

FIG. 3A illustrates details of receiver network RR. Receiver network RR provides a call receiver R1–R*n* for each device D1–D*n*, each of such devices being adapted to generate a call Each call signal *ad*1, *ad*2, . . . , adn transmitted by a device is accompanied by a data item *xd*1, *xd*2, . . . , *xdn*, which specifies the response delay required by the call. This response delay represents a coefficient to be assigned to the minimum time interval d fixed by the configuration of the system formed of the n devices and their processor. Data items *i*1, 12, . . . , in, which represent the respective device to which call receivers R1–R*n* are assigned, data items *a*1, *a*2, . . . , a*n*, which represent the generation of a call by the corresponding calling device, and data items *x*1, *x*2, . . . , *xn*, which represent the response delay required by the accompanying call are rendered avaiable by selection of the corresponding call receiver. This selection is performed by sequential selection circuit CSR, which comprises a selection register RSR associated with a decoder DSR. Register RSR is cleared to zero by the order DSR generated by sequential control unit UCS. The progression of the contents of selection register RSR is controlled by the order PSR so as to sequentially select call receivers R1, R2, . . . , R*n* by means of selection signals *sr*1, *sr*2, . . . , *srn*.

Figure 3B:
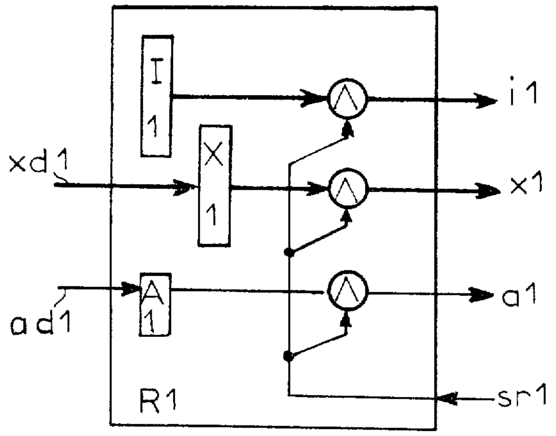

FIG. 3B illustrates details of call receiver R1 (which is identical to call receivers R2–R*n*). Call receiver R1 comprises a register I1 whose contents represent the identity of the device to which the receiver is assigned, a register X1 in which is stored the delay data item *x* which accompanies a call from such device, a flip-flop A1 controlled by the reception of a call from such device, and three AND-gates simultaneously enabled by the corresponding selection signal *sr*1. Arrangements (not shown) are provided for resetting flip-flop A1 to its initial waiting position when the call represented by data item *a*1 has been processed.

FIG. 4A illustrates details of memory network RM. Memory network RM comprises memories M1, M2, . . . , *Mn* for devices adapted to generate calls. This network of n memories is associated with circuits CSM for selection by transfer of identities. Selection circuits CSM comprise two registers for selection of different ones of memories M1–M*n*, selector register RSM and pointer register RPM. The contents of registers RSM and RPM are respectively decoded by decoders DSM and DPM. The output signals *pm*1, *pm*2, . . . , *pmn and sm*1, *sm*2, . . . , *smn* of decoders DPM and DSM are selection signals for memories M1–M*n*, whereby these memories can be selected in two different ways.

Information denoting the identity of the ones of memories M1–M*n* to be selected are provided by signals *tpm* and *tsm*, which entered into respective registers RPM and RSM.

FIG. 4B illustrates details of memory M1 (which is identical to memories M2–M*n*. Memory M1 comprises a test register T1, a delay decrementer register CX1, a "preceding" identity register P1 and a "following" identity register S1.

Test register T1 is coupled to three AND-gates, two of which are input gates respectively enabled by the signals *pm*1 and *sm*1 for entering into register T1 the information represented by the respective signals tap and tas, and the other of which is an output gate enabled by the signal *pm*1 for transmitting the contents of register T1 (such contents when transmitted being represented by the signal *tp*1).

Delay decrementer register CX1 is coupled to three AND-gates, one of which is an input gate enabled by the signal *sm*1 for entering into register CX1 the information represented by the signal *txx*, one of which is an output gate enabled by the signal *pm*1 for transmitting the contents of register CX1 (such contents when transmitted being represented by the signal *xp*1), and the other of which is a decrementing control gate enabled by the order RCX generated by sequential control unit UCS for decrementing by 1 the number represented by the contents of register CX1.

"Preceding" identity register P1 is coupled to four AND-gates, two of which are input gates respectively enabled by the signals *pm*1 and *sm*1 for entering into register P1 the information represented by the respective signals *tsb* and *tbp*, and the other two of which are output gates also respectively enabled by the signals *pm*1 and *sm*1 for transmitting the contents of register P1 (such contents when transmitted being represented by the respective signals *pp*1 and *ps*1).

"Following" identity register S1 is coupled to three AND-gates, one of which is an input gate enabled by the signal *sm*1 for entering into register S1 the information represented by the signal *tsc*, and two of which are output gates respectively enabled by the signals *pm*1 and *sm*1 for transmitting the contents of register S1 (such contents when transmitted being represented by the respective signals *sp*1 and *ss*1).

Figure 5R:
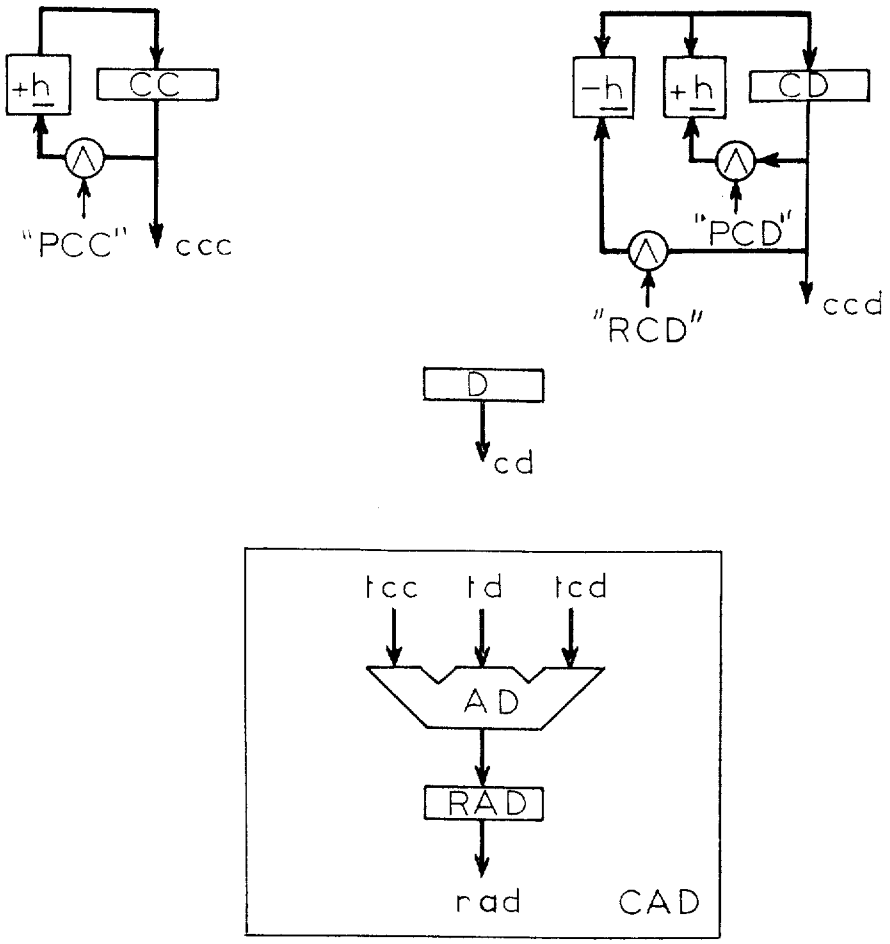

FIG. 5 illustrates details of calculating network RC. Network RC comprises an addition circuit CAD, which, in turn, comprises an adder AD for adding together data represented by the signals *tcc*, *td* and *tcd* supplied to the input leads of adder AD. The resulting sum, representing test time *t*, is transferred into output register RAD. Calculating network RC further comprises register D, whose fixed contents represent the minimum time interval *d* (fixed by the configuration formed of the *n* devices and their processor), regiser CC, and register CD.

Register CC is a cycle counter clock-register whose contents represent the execution time H. Register CC is coupled to an AND-gate enabled by the order PCC generated by sequential control unit UCS for incrementing the number represented by the contents of register CC by the value *h*.

Register CD is an incrementer-decrementer register whose contents are denoted by the symbol *a* and are added to the execution time H of the cycle and the fixed time *d* for defining a test time *t*. Register CD is coupled to two AND-gates enabled by the respective order PCD and RCD generated by sequential control unit UCS for respectively increasing and decreasing the number represented by the contents of register CD by the value *h*.

FIGS. 6A and 6B illustrate details of transfer network RT. FIG. 6A shows the basic comparator network RCP and FIG. 6B shows the basic network of AND-gates which enable the transfer of information signals. The comparisons and transfers are effected by network RT under control of orders generated by sequential control unit UCS.

Figure 7A:
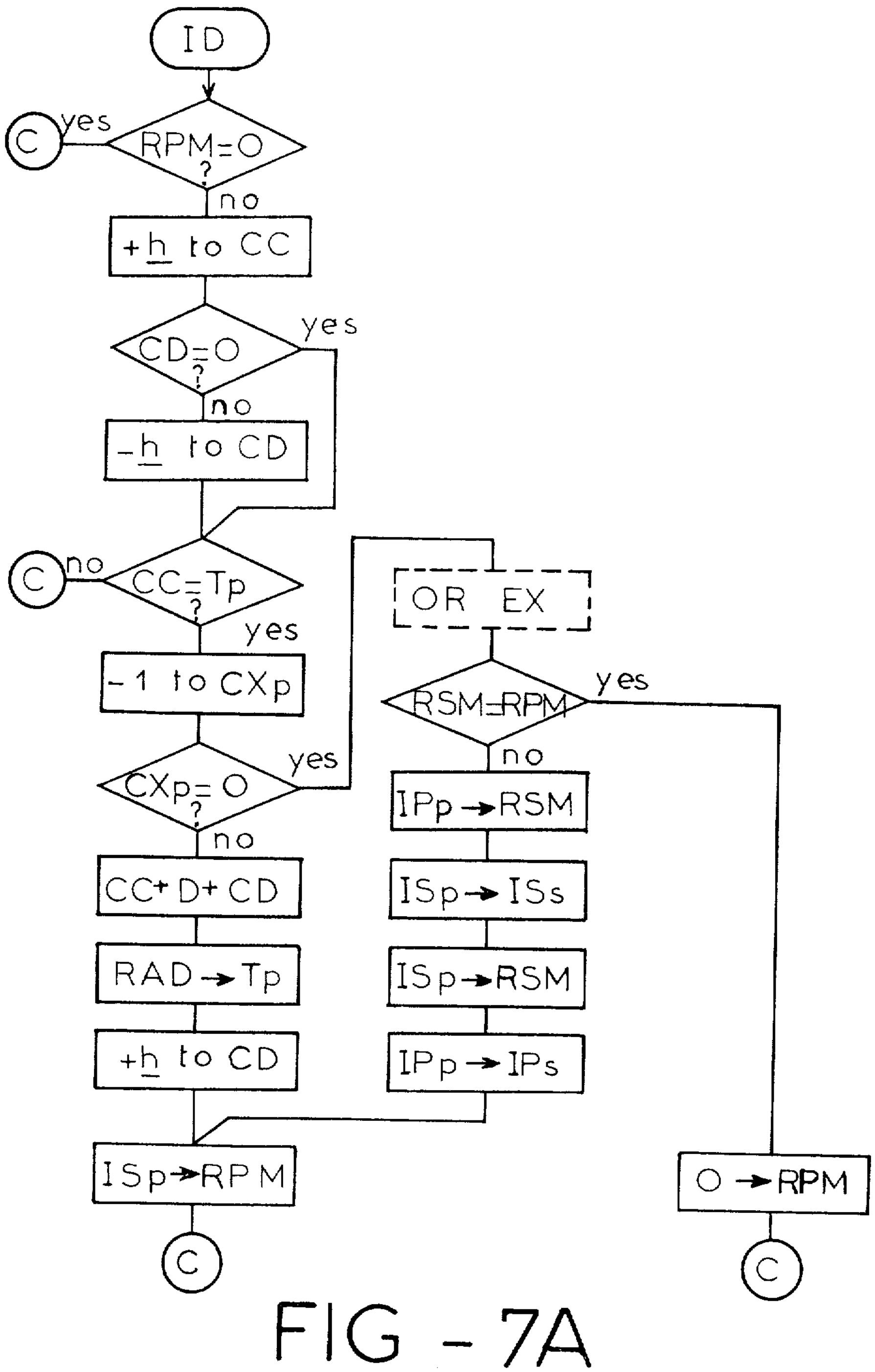
FIGS. 7A and 7B show a flow chart of the controls furnished by the sequential control unit which illustrates the method of the invention.
Figure 7B:
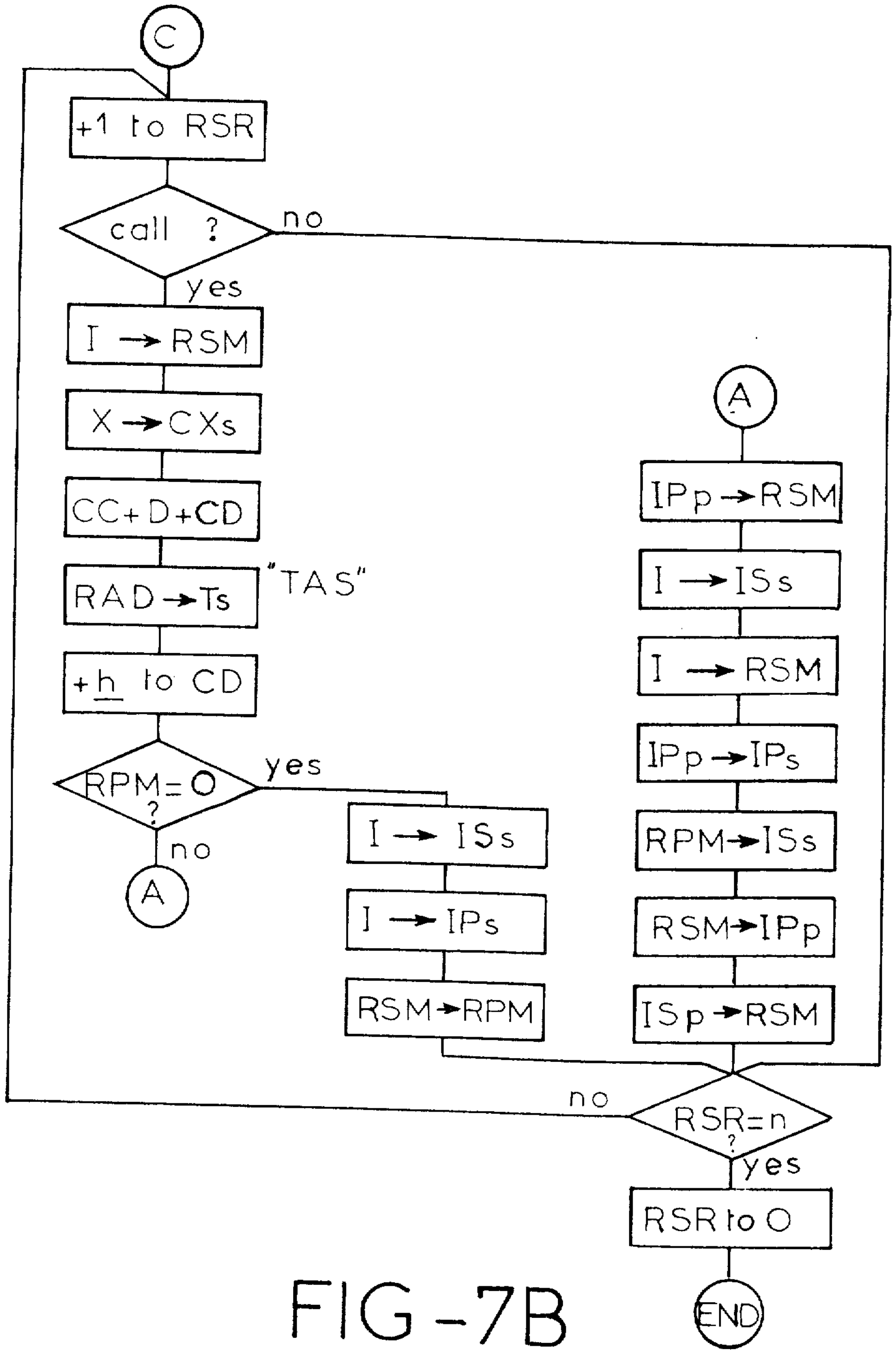

The two phases of the control cycle, defined by the method of the invention, will be explained by reference to FIGS. 7A and 7B, considered in connection with FIGS. 2–6. FIGS. 7A and 7B represent a flow chart of the successive orders generatd by sequential control unit UCS, whose control cycle is triggered by a pulse ID furnished by trigger generator GD.

The first order of the control cycle that is generated by sequential control unit UCS, order CRP, compares the contents of pointer register RPM, FIG. 4A, with data of value 0. (It will be shown hereinafter that the contents of register RPM are equal to 0 when no memory is chained.) Comparison order CRP enables the AND-gate coupled to comparator CRP, FIG. 6A, to transfer the pointer contents of register RPM, represented by the signal *rpm*, to comparator CRP. It will be assumed,at this point in the instant description, that no memory is chained, so that the contents or register RPM are equal to 0 and comparator CRP delivers the signal *p* ("yes" in the flow chart of FIG. 7A). Signal *p* is then transferred to sequential control unit UCS, FIG. 2, and the sequence of orders branches to the phase of detecting calls and of chaining the detected calls, FIG. 7B.

Therefore, the next order, PSR, increments by 1 the contents of selection register RSR, FIG. 3A, of the sequential selection circuit CSR associated with the *n* call receivers. Therefore, because the original contents of register RSR are equal to 0, receiver R1 is now selected.

The next order generated, order DRA, compares data item *a*1, FIG. 3B, with the fixed value data item *ca*, FIG. 6A (signal *a*1 represents the value *ca* when a call has been received by receiver R1).

If the device D1, associated with receiver R1 has generated a call, the order TIR is generated, which transfers (FIG. 6B, VII) the contents of register I1, FIG. 3B (receiver R1 being selected at this time) into selector register RSM of memory selection circuits CSM, FIG. 4A. The contents of register I1, and now of selector register RSM, represent the identity of calling device D1. Thus, memory M1 is selected by the resulting signal *sm*1 delivered by decoder DSM.

The next orders, generated in succession, are:

order TXX, which transfers (FIG. 6B, II) the contents of register X1, FIG. 3B, into register CX1 of memory M1, FIG. 4B (the variable *s*, as in CX*s*, employed in the flow chart denotes the particular one of memories M1–M*n* selected in a data transfer by selector register RSM);

order ADD, which adds (FIG. 6B, III) the contents of registers CC, D, and CD as represented by the respective signals *ccc*, *cd* and *ccd*, FIG. 5. As has been explained previously herein, the sum obtained by such addition determines the test time *t* assigned to memory M1. In the case where no memory has yet been chained, the contents of each of registers CC and CD are equal to 0. Therefore, the sum obtained, at this point in the instant description, is equal to the minimum delay *d* contents of register D, expressed in terms of time interval *h*, as described previously herein:

order TAS, which transfers (FIG. 6B, V) the contents of output register RAD, represented by the signal *rad*, which contents are the test time *t* delivered by adder AD, and are represented by the signal *rad*, FIG. 5, into register T1 of selected memory M1, FIG. 4B;

order PCD, which increments the number represented by the contents or register CD, FIG. 5, by the value *h*; and order CRP, which again compares the contents of pointer register RPM with data of value 0. It had been assumed in the instant description that the chain was initially empty, so that the contents of register RPM are still equal to 0. Therefore, the signal *p* delivered again by comparator CRP causes the sequence of orders to branch to the series of three orders shown in the central column of FIG. 7B ("yest" in the flow chart of FIG. 7B). These three orders, generated in succession, are:

order TIS, which transfers (FIG. 6B, I) the identity of the selected calling device D1 into "following" identity register S1 of selected memory M1, FIG. 4B;

order TIP, which transfers (FIG. 6B, IV) the identity of the selected calling device D1 into "preceding" identity register P1 of selected memory M1; and order TSP, which transfers (FIG. 6B, VI) the contents of register RSM, FIG. 4A and, therefore, the identity of the selected calling device, into pointer register RPM.

Consequently, memory M1 now becomes the "pointee" memory due to the signal *pm*1 issuing as a consequence of the decoding of the contents of register RPM.

The last described succession of three orders creates a single "chain" of memory M1 by loading both the "preceding" and "following" identity registers of memory M1 with the same identification, that of memory M1. In addition, pointer register RPM was loaded with the identity of memory M1 to point to the single memory in the chain.

Following this entering of the first memory into the chain, the next order CNR compares the contents of the receiver selection register RSR, FIG 3A, with data of value *n*, FIG. 6A. At this point in the instant example, the contents of register RSR are now equal to 1, as represented by the signal *sr*. Therefore, comparator CNR delivers the signal *r* ("no" in the flow chart of FIG. 7B), which causes the sequence of orders to branch to the selection and testing of call receiver R2. Thus, the call receivers are successively selected to test for the possible presence of a respective calling condition and the memories corresponding to receivers having calls from their respective devices are consecutively chained. However, because the chain is no longer empty, the comparison effected by the order CRP following selection of a call results in delivery of the signal *p* ("no" in the flow chart of FIG. 7B), which causes the sequence of orders to branch to the series of orders shown in the right column of FIG. 7B.

The successive orders of this series are:

order TBS, which transfers (FIG. 6B, VII) the contents of "preceding" identity register Ps of the pointee memory, FIG. 4B, into selector register RSM, FIG. 4A (the variable *p* as in P*s*, employed in the flow chart denotes the particular one of memories M1–M$n$ selected in a data transfer by pointer register RPM);

order TIS, described previously herein, which transfers the identity of the selected calling device into "following" identity register S$s$ of the selected memory;

order TIR, described previously herein, which transfers the identity of the selected calling device into selector register RSM;

order TIB, which transfers (FIG. 6B, IV) the contents of the "preceding" identity register P$p$ of the pointee memory, FIG. 4B, into the "preceding" identity register P$s$ of the selected memory, FIG. 4B;

order TPC, which transfers (FIG. 6B, I) the contents of pointer register RPM, FIG. 4A, into the "following" identity register S$s$ of the selected memory, FIG. 4B;

order TSB, which transfers (FIG. 6B, IV) the contents of selector register RSM into the "preceding" identity register P$p$ of the pointee memory; and order TSS, which transfers (FIG. 6B, VII) the contents of the "following" identity register S$p$ of the pointee memory into selection register RSM.

The purpose of this last-described series of orders is to "chain" a memory into the circular wating queue by entering into the "preceding" and "following" identity registers of such memory the respective identities of its preceding memory and its following memory in the circular waiting queue. The chain of the queue is always circular in sense because the information stored in the "preceding" and "following" identity registers of a single memory queue expresses the identity of such memory, which is symbolic, therefore, at the time of the preceding memory and the following memory.

For each of the chainings effected during a single control cycle, the contents of register CD are incremented by the value $h$. Therefore, the test times $t$ assigned to the successively chained memories during a particular control cycle are separated by an amount equal to time interval $h$.

The phase of detecting calls and of chaining the detected calls is terminated when the order OSR clears to 0 receiver selection register RSM. The order OSR is generated after comparator CNR, FIG. 6A, delivers the signal $r$, which denotes that all of the call receivers have been selected and tested.

It had been assumed for the control cycle example described above the pointer register RPM of the selection circuits associated with the $n$ memories contained no information because no memory was chained, which caused the sequence of orders to branch to the phase of detecting calls and of chaining the detected calls. If, on the other hand, it is assumed that the circular chain is not empty, comparator CRP, FIG. 6A, delivers the signal p and the sequence or orders branches to the phase of testing the waiting call whose test time $t$ is closest to the execution time H of the cycle. The sequence of orders generated during this testing phase is shown in FIG. 7A, and commences with the successive:

order PCC, which increments the execution time H represented by the contents of register CC by the value $h$, FIG. 5; and order COD, which compares the contents of register CD, FIG. 5, with data of value 0, FIG. 6A, and if such contents are not equal to 0, comparator COD delivers the signal $d$.

If comparator COD delivers the signal $d$, the order RCD is generated, which decrements the number represented by the contents of register CD by the value $h$, FIG. 5.

This decrementing of register CD has the advantage of limiting to the value $h$ the amount separating the test times $t$ assigned to the last memory chained during a particular control cycle $c$ and the first memory chained during the next control cycle $c + h$.

If the contents of register CD are equal to 0, the signal $d$ delivered by comparator COD prevents decrementing of the contents of register CD.

The next three orders relate to the actual testing of the waiting memory pointed to by pointer register RPM. Thus, the order CCT compares the execution time H in register CC, FIG. 5, with the test time $t$ in register T$p$ of the pointee memory, FIGS. 4B and 6A. If the execution time H differs from test time $t$, comparator CCT delivers the signal $t$ ("no" in the flow chart of FIG. 7A), which causes the sequence of orders to branch to the phase of detecting calls and of chaining detected calls. However, if the test time $t$ is equal to the execution time H, comparator CCT delivers the signal $t$("yes" in the flow chart of FIG. 7A), which causes the following two orders to be generated:

order RCX, which decrements the delay data item $x$ in delay decrementer register CX$p$ of the pointee memory by the value 1, FIG. 4B; and order COX, which compares the delay data item in delay decrementer register CX$p$ of the pointee memory with data of value 0, FIG. 6A.

It has been explained above that the information stored in the delay decrementer register of a chained memory expresses the response delay required by the calling device in the form of a coefficient assigned to the minimum time interval $d$. Consequently, if the delay data item in register CX$p$ has not become equal to 0, a new test time must be calculated by adding time interval $d$ to the execution time H of the cycle, or to the test time $t$ previously calculated (in fact, the contents of register CD must also be added to such new test time in order to preserve the option of only a single waiting memory requiring testing during a control cycle). On the other hand, if the delay data item in register CX$p$ has become equal to 0, the pointee memory must be unchained from the circular waiting queue and the corresponding call processed.

Therefore, the sequence of orders which follows the generation of comparison order COX either branches:

to the series of orders shown in the central column of FIG. 7A, for unchaining the pointee memory and reforming the chain if comparator COX delivers the signal $x$ ("yes" in the flow chart of FIG. 7A), or to the series of orders ADD, TAP and PCD for calculating a new test time, if comparator COX delivers the signal $x$ ("no" in the flow chart of FIG. 7A).

The function of unchaining the pointee memory and reforming the chain is preceded by execution or the order OR EX, which is processing order (for responding to the call) whose characteristics are beyond the scope of the instant invention. This processing order is followed by the order CPS, which compares the contents of memory pointer register RPM and memory selector register RSM, FIG. 6A. As described previously herein, the contents of registers RPM and RSM are identical when the circular waiting queue only contains a single memory. Thus, if the queue holds only one memory, comparator CPS, FIG. 6A, delivers the signal *s* ("yes" in the flow chart of FIG. 7A), which causes generation of the order ORP. Order ORP transfers (FIG. 6B, VI) data of value 0 into pointer register RPM, thereby terminating the queue.

However, if the queue holds more than one memory, comparator CPS delivers the signal *s*, which causes generation of the series of orders TBS, TIC, TSS and TIB, which orders transfer (respective FIG. 6B, VII, I, VII and IV) the contents of "following" identity register S*p* of the pointee memory to be unchained, FIG. 4B, into the "following" identity register of the preceding memory, and the contents of "preceding" identity register P*p* of the pointee memory into the "preceding" identity register of the following memory, thereby reforming the circular waiting queue.

Whichever branch is directed by the results of comparison order COX of the waiting call test phase, the waiting memory to be tested during the next control cycle is that which, in the chain, next follows the memory whose test register contents have been found to be equal to the contents of register CC. This is because the order TCP, which terminates the waiting call test phase, transfers (FIG. 6B, VI) the identity of this following memory into pointer register RPM.

Figure 8A:
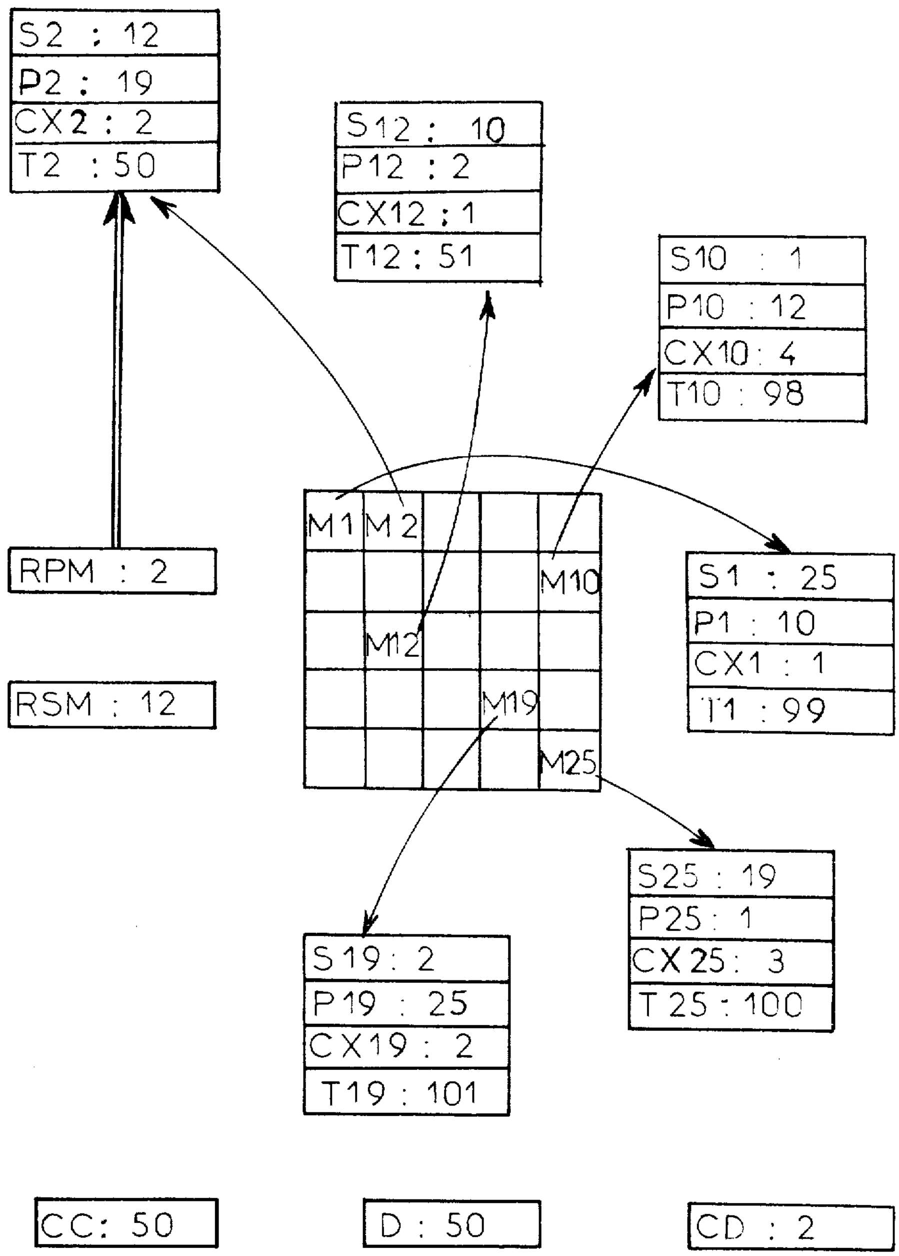
FIGS. 8A, 8B and 8C illustrate an example of the evolution of a chain formed under control of the sequential control unit, considering the calls generated by seven devices.
Figure 8B:
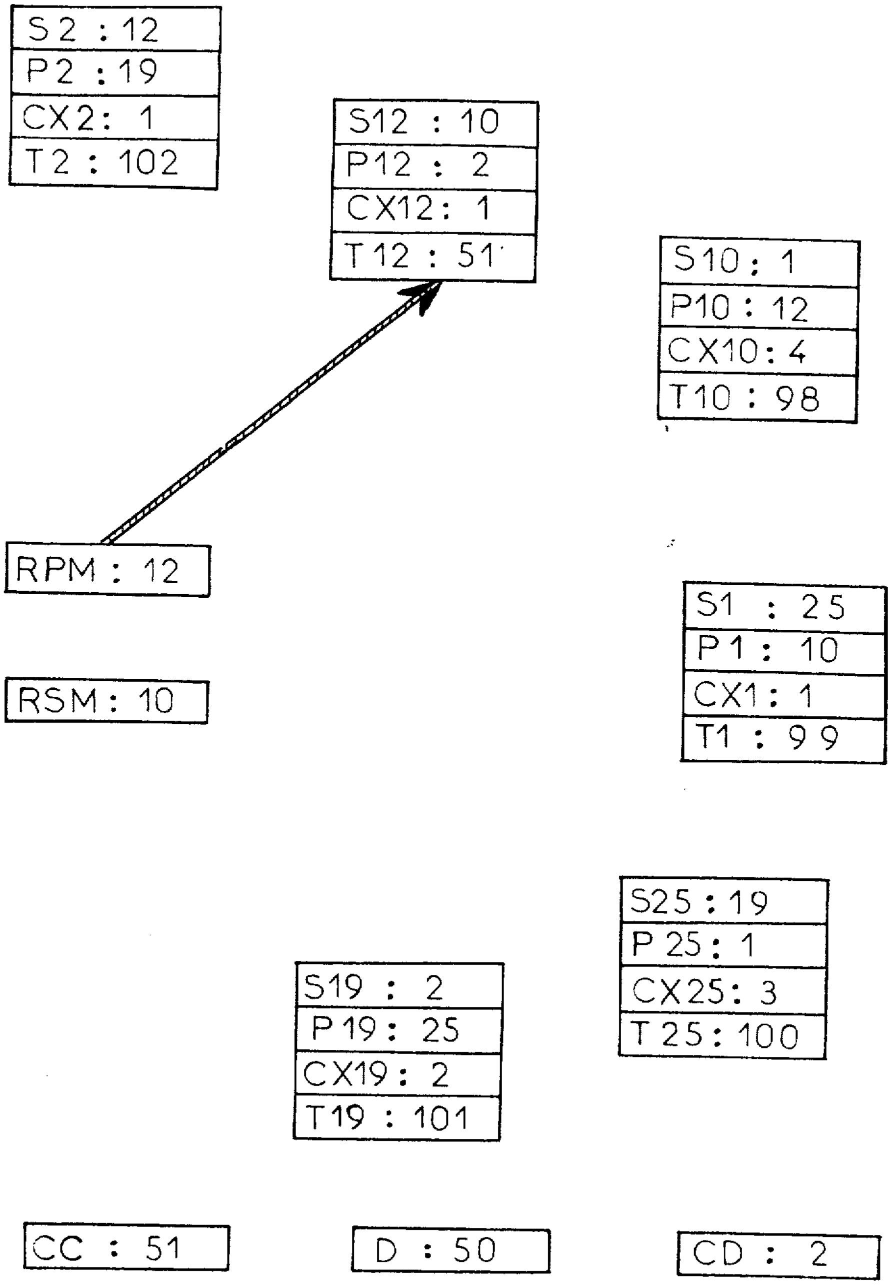
Figure 8C:
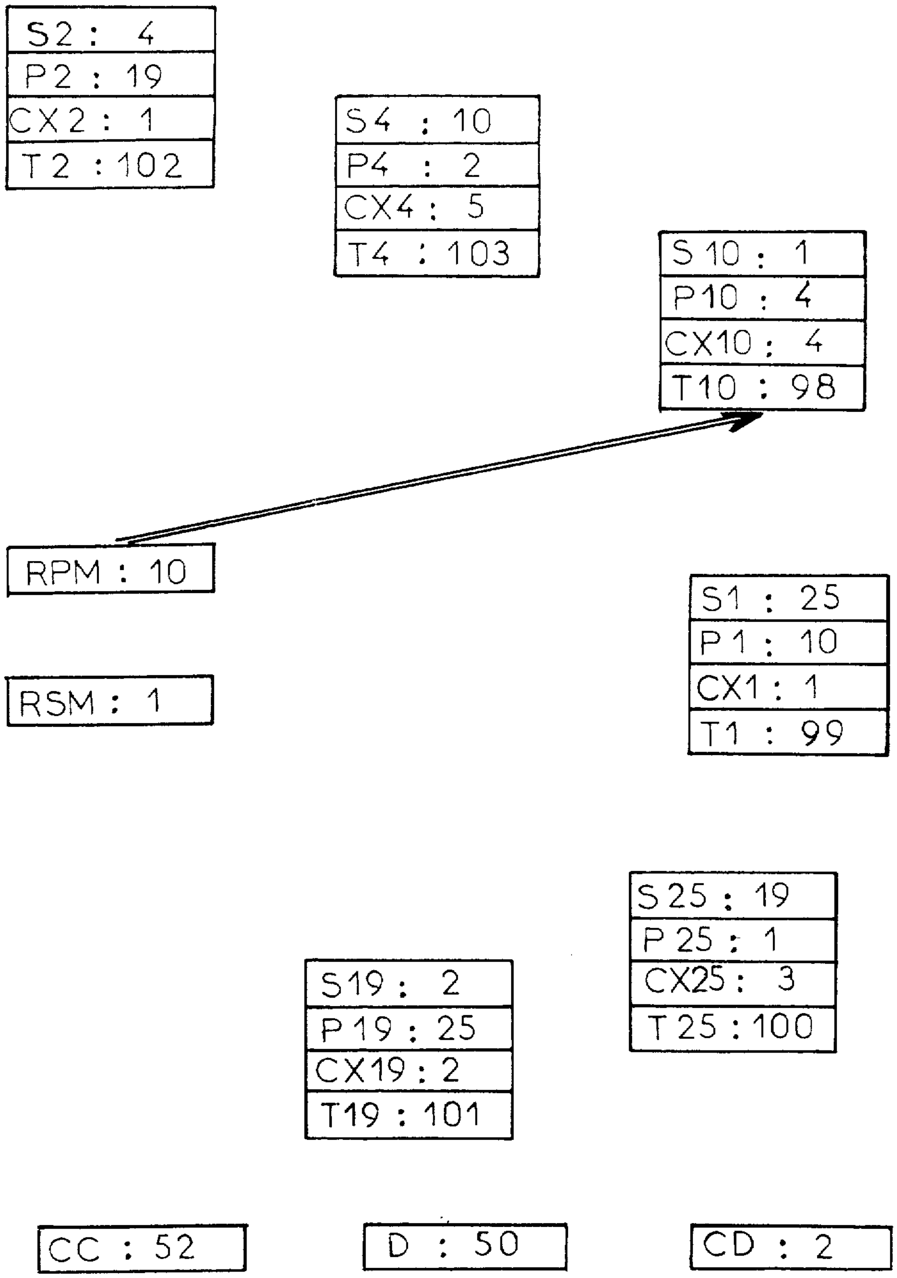

FIGS. 8A, 8B and 8C show an example of the formation and evolution of a circular waiting queue to illustrate the characteristics of the method and circuits of the invention.

In the example as shown in FIG. 8A, the following assumptions have been made:

- that the time interval *h* between successive control cycles is 1 ms,
- that the minimum time interval *d* required by the configuration of the sytem is 50 ms,
- that the memory assigned to device no. 2 has been chained during control cycle 0 and that the response delay required by device no. 2 is equal to 2*d*.
- that the memory assigned to device no. 12 has been chained during control cycle 1, and that the response delay required by device no. 12 is equal to 1*d*,
- that the memories assigned to devices no. 10 and no. 1 have been chained during control cycle 48, and that the response delays required by these devices are respectively equal to 4*d* and 1*d*,
- that the memories assigned to devices no. 25 and no. 19 have been chained during control cyle 49, and that the response delays required by these devices are respectively equal to 3*d* and 2*d*, and
- that 50 ms has passed since the chaining of the memory pointed by pointer register RPM, which is memory no. 2.

The contents of register CD are initially equal to 0. These contents are incremented to 1 during the chaining of memory no. 2. The contents of register CD are restored to 0 at the start of control cycle 1 and then are again incremented to 1 during the chaining of memory no. 12. At the start of control cycle 2 the contents of register CD are again restored to 0 and are maintained at this value until control cycle 48. During control cycle 48 the contents of register CD reach 2 during the chaining of memory no. 1, the second memory chained during control cycle 48. At the start of control cycle 49 the contents of register CD are reduced to 1, but then reach 3 during the chaining of memory no. 19, the second memory chained during control cycle 49. At the start of control cycle 50 the contents of register CD are reduced to 2.

FIG. 8B represents the evolution of the circular waiting queue formed as shown in FIG. 8A. It is assumed that no memory was chained during control cycle 50. However, during the testing of memory no. 2 in control cycle 50, the test time *t* in register T2 of memory no. 2 was found to be equal to the execution time H in register CC. Consquently, the delay data item *x* in register CX2 was decremented by 1. Because this delay data item *x* did not reach 0, a new test time *t* for memory no. 2 was calculated. This new test time became 102, the result of the addition of the contents of registers CC, D and CD. The contents of register CD were increased to 3 following the storing of this new test time in memory no. 2, and the memory pointed to by register RPM became the following chained memory, memory no. 12.

Therefore, the situation immediately after the start of control cycle 51 is that which is represented in FIG. 8B. At the start of this control cycle, the contents of register CD have been reduced by 1 to the value 2.

FIG. 8C represents the evolution of the circular waiting queue and its condition at the start of control cycle 52. It is assumed at this point that the memory assigned to device no. 4 was chained during cycle 51. At that moment, the addition of the contents of registers CC, D, and CD defined, for memory no. 4, a test time *t* of 103, and the contents of register CD were incremented to 3. However, during control cycle 51, and previous to the chaining of memory no. 4, the testing of memory no. 12, then pointed to by pointer register RPM, revealed equality between its test time *t* in its register T12 and the execution time H in register CC, whereby the consequent decrementing by 1 of the delay data item *x* in register CX12, reduced the contents of register CX12 to 0. Memory no. 12 was then unchained from the waiting queue.

The removal of memory no. 12 from the circular waiting queue was accomplished, as explained previously herein, by the modification of the contents of "following" identity register S2 of memory no. 2 and of "preceding" identity register PIO of memory no. 12 (10 was transferred into register S2 of memory no. 2 and 2 was transferred in register PIO of memory no. 10. The subsequent insertion of memory no. 4 into the waiting queue caused a new modification of the contents of registers S2 and PIO, the results of which are illustrated in FIG. 8C and explained by the series of orders shown in the right column of the flow chart of FIG. 7B.

Therefore, the resulting situation is that represented in FIG. 8C at the start of control cycle 52. The contents of register CD have been reduced to 2 and the memory pointed to by register RPM is now memory no. 10.

It is to be understood that the preceding description has been provided solely to present a nonlimiting example and that variations relating to particularly:

- the sequences of the orders described and, consequently, the transfer network and the comparator network,
- the organization of the sequential control unit,
- the structure of the call receivers,
- the addition of the supplementary registers, without modification of the principles established by the claimed method, may be realized without departing from the scope of the invention.

I claim:

1. A circuit for processing calls distributed randomly in time and generated by a plurality of devices, each call being accompanied by a delay data item which represents the response delay required by the calling device in terms of a multiplier to be assigned to a predetermined minimum time interval *d*, comprising:
- a sequential control unit for controlling the operation of said circuit in cycles and for providing a succession of control order signals during each cycle;
- a plurality of call receivers, one receiver for each device;
- a sequential selection circuit for sequentially selecting said call receivers in response to said control order signals;
- a plurality of alterable memories, one alterable memory for each device, each of said memories comprising means for chaining into a circular waiting queue a memory assigned to calling devices;
- a calculating network responsive to said control order signals for generating a first representation of the number of said cycles of operation of said circuit, a second representation of the number of said calling devices for which memories are chained into said queue, and a sum representation of the quantities represented by said first and second representations; and
- a transfer network responsive to said control order signals and coupled sequentially to said memories, to the ones of said call receivers selected by said selection circuit, and to said calculating network, for transferring to one of said memories the delay item provided by a calling device and the current sum representation generated by said calculating network.

2. The circuit of claim 1 wherein said sequential control unit comprises:
- a control memory for generating said control order signals in particular sequence, such signals representing orders for comparison which upon execution cause the modification of said sequence according to the results of the comparison effected, and;
- a pulse generator for triggering cycles of said control memory.

3. The circuit of claim 2 wherein said calculating network comprises an adder, a register having contents representing a fixed interval, a cycle counter, and an incrementer-decrementer, said incrementer-decrementer being responsive to certain of said control order signals for providing said second representation which evolves as a function of the number of said cycles and as a function of the number of calls chained in said circular waiting queue, wherein said adder delivers said sum representation which is a function of the sum of said register contents, said cycle counter and said second representation.

4. The circuit of claim 3, wherein said sequential selection circuit, while sequentially selecting said receivers, detects calls generated by the respective devices and enables the transfer of the identities of the calling devices and the corresponding delay data items.

5. The circuit of claim 4 wherein each of said call receivers comprises:
- an identity register for holding the identity of the device to which said call receiver is assigned;
- a response delay register for holding the delay data item accompanying a call generated by the corresponding device; and
- a call transfer device.

6. The circuit of claim 5 further comprising a memory selection circuit, said selection circuit comprising a selector register having input leads selectively coupled to output leads of said identity registers of said call receivers in response to said control order signals.

7. The circuit of claim 6 further comprising a plurality of comparators, wherein each of said alterable memories comprises:
- a test register;
- a delay decrementer register;
- said delay decrementer register being coupled through said transfer network to selected ones of said memories, the input lead of said test register being connected to said adder for receiving said sum representation, the output lead of said test register being connected to a first input lead of a first comparator, a second output lead of said first comparator being connected to said cycle counter, the input leads of said delay decrementer register being selectively connected to the response delay registers of said call receivers, the output lead of said delay decrementer register being connected to one input lead of a second comparator, a second input lead of such comparator continuously receiving a signal representing the number value 0.

8. The circuit of claim 7 wherein each one of said means for chaining of said memories comprises:
- a "preceding" identity register for identifying the device whose corresponding memory in said queue was chained into said queue immediately preceding the time of the chaining of the memory having said one means for chaining;
- a "following" identity register for identifying the device whose corresponding memory in said queue was chained into said queue immediately following the time of the chaining of the memory having said one means for chaining.

9. The circuit of claim 8 further comprising a pointer register whose contents identify the device for which the sum representation stored in the test register of the corresponding memory is the closest to the time representation furnished by said cycle counter, said pointer register being selectively coupled to the output leads of said "following" identity registers by said transfer network under control of a control order signal, wherein the input leads of said "preceding" and "following" identity registers of one of said memories are selectively coupled, through said transfer network, under control order signal and said pointer register contents, to the respective output leads of said "preceding" identity registers and "following" identity registers of said memories, when the output lead of said second comparator denotes that the contents of said delay decrementer register of the memory corresponding to the device whose identity is held in said pointer register represents the number 0.

10. The circuit of claim 9 wherein said incrementer-decrementer of said calculating network is coupled to an incrementing-decrementing circuit which provides for:

incrementing the contents of said incrementer-decrementer each time said sequential control unit transfers the representation of said adder to the test register of one of said memories;

decrementing the contents of said incrementer-decrementer each time that said sequential control unit causes the progression of said cycle counter of said calculating network.

11. In a data processing system in which each of a plurality of devices makes calls requiring processing, and wherein in making such calls such device supplies a delay data item representing the delay after which the coresponding call is to be processed, the combination comprising:

a plurality of memory elements, said elements being organized into a closed chain wherein each of said elements stores a representation of the preceding and following element in said chain, each of said elements further storing one of said delay data items and a test time item, said test time item representing the time when the corresponding delay data item should be tested to determine whether the respective call should be processed;

a pointer register for holding a pointer representing one of the elements in said chain;

a generator of a current time item representing the current time;

a first comparator responsive to an input control signal and said pointer for comparing the test time item in the pointee element with said current time item and for delivering a first result signal denoting equality and a second result signal denoting inequality;

means enabled after delivery of the first result signal of said first comparator for changing the value of the delay data item in said pointee element;

a second comparator enabled after delivery of the first result signal of said first comparator and responsive to said pointer for comparing the delay data item in the pointee element with a predetermined number and for delivering a first result signal denoting equality and a second result signal denoting inequality;

means responsive to the delivery of the first result signal of said second comparator for initiating processing of the call corresponding to the pointer, for removing the pointee element from said chain, and for changing the value of said pointer to represent the following element in said chain; and means responsive to the delivery of the second result signal of said second comparator for storing a new test time item in the pointee element.

12. The combination of claim 11 further comprising:

means responsive to a call by a device for temporarily storing the corresponding delay data item;

means responsive to a call by a device and to said current time item for generating a test time item, said test time item representing an interval following the current time represented by said current time item after which said delay data item should be tested; and means following generation of said test time item for entering said test time item and corresponding delay data item in a separate memory element and responsive to said pointer for inserting said separate memory element into said chain in a position immediately preceding the pointee element.

13. The combination of claim 12 further comprising:

a generator of regularly recurring stimuli, said stimuli being temporally spaced apart by a cyclic interval; and means for applying said stimuli to said first comparator as said input control signal thereto.

14. The combination of claim 13 wherein the interval represented by each of said test time items is at least a predetermined minimum number of said cyclic intervals and each of said delay data items represents an integral number of said minima.

15. The combination of claim 14 wherein for each call for which a memory element is inserted into said chain during a particular cyclic interval, the intervals represented by the corresponding test time items differ by said cyclic interval.

* * * * *